US009479570B2

(12) United States Patent
Lai et al.

(10) Patent No.: US 9,479,570 B2
(45) Date of Patent: Oct. 25, 2016

(54) SYSTEM AND METHOD FOR PROCESSING LOAD BALANCING OF GRAPHIC STREAMS

(71) Applicant: WISTRON CORP., New Taipei (TW)

(72) Inventors: Alexander I-Chi Lai, New Taipei (TW); Pei-Ling Yu, New Taipei (TW)

(73) Assignee: Wistron Corp., New Taipei (TW)

( * ) Notice: Subject to any disclaimer, the term of this patent is extended or adjusted under 35 U.S.C. 154(b) by 453 days.

(21) Appl. No.: 13/938,174

(22) Filed: Jul. 9, 2013

(65) Prior Publication Data

US 2014/0115036 A1   Apr. 24, 2014

(30) Foreign Application Priority Data

Oct. 18, 2012 (TW) .............................. 101138372 A (51) Int. Cl.
*G06F 15/16* (2006.01)
*H04L 29/08* (2006.01)
*G06T 1/20* (2006.01)
*G06F 9/50* (2006.01)

(52) U.S. Cl.
CPC ................ *H04L 67/10* (2013.01); *G06T 1/20* (2013.01); *H04L 67/08* (2013.01); *G06F 9/5044* (2013.01)

(58) Field of Classification Search
CPC ......... H04L 67/10; H04L 67/08; G06T 1/20; G06F 9/5044
USPC ....................................................... 709/203
See application file for complete search history.

(56) References Cited

U.S. PATENT DOCUMENTS 7,609,280 B2 * 10/2009 Subramanian ........ G06T 15/005
 345/522
8,166,398 B2 *  4/2012 Wang .................... G06F 9/4443
 715/719

(Continued)

FOREIGN PATENT DOCUMENTS

TW  200948088 A1  11/2009
TW  201030621 A1   8/2010

OTHER PUBLICATIONS

Taiwan Patent Office, Office Action, Patent Application Serial No. 101138372, Oct. 27, 2014, Taiwan.

(Continued)

*Primary Examiner* — Melvin H Pollack (57) ABSTRACT

A method for processing load balancing of graphic streams is provided. The method is used in a system, wherein the system includes a server device and a client device, and the method includes the steps of: receiving, by a virtual machine, a graphic with a plurality of objects and graphic capability information; dispatching, by a dispatcher, the plurality of objects according to the graphic capability information; receiving, by a server GPU, a first group of objects dispatched by the dispatcher, and transforming the first group of objects into a first video stream; receiving, by a virtual desktop viewer, a second group of objects dispatched by the dispatcher; transforming, by a client GPU, the second group of objects into a second video stream; and rendering, by a virtual desktop viewer, the first video stream and the second video stream.

8 Claims, 6 Drawing Sheets

(56) References Cited

U.S. PATENT DOCUMENTS

| | | | | |
|---|---|---|---|---|
| 8,224,885 B1* | 7/2012 | Doucette | G06F 9/5044 | 709/201 |
| 8,330,762 B2* | 12/2012 | Grossman | H04N 9/87 | 345/502 |
| 8,341,611 B2* | 12/2012 | Munshi | G06F 8/314 | 717/114 |
| 8,405,666 B2* | 3/2013 | Masood | G06F 9/455 | 345/522 |
| 8,497,865 B2* | 7/2013 | Bakalash | G06T 15/005 | 345/501 |
| 8,570,441 B2* | 10/2013 | Nakayama | H04N 7/013 | 345/592 |
| 8,612,614 B2* | 12/2013 | Jagannath | H04L 12/1859 | 709/203 |
| 8,640,180 B2* | 1/2014 | Carroll | H04N 5/445 | 348/569 |
| 8,806,513 B2* | 8/2014 | Munshi | G06F 9/4843 | 717/119 |
| 8,881,141 B2* | 11/2014 | Koch | G06F 9/45558 | 718/1 |
| 8,968,087 B1* | 3/2015 | Gault | A63F 13/10 | 345/630 |
| 9,015,337 B2* | 4/2015 | Hemed | H04L 43/50 | 370/251 |
| 9,047,390 B2* | 6/2015 | Canitz | G06F 17/30905 | |
| 9,052,953 B2* | 6/2015 | Maldaner | G06F 9/5011 | |
| 9,064,334 B2* | 6/2015 | Patel | G06T 15/50 | |
| 9,069,622 B2* | 6/2015 | Post | G06F 9/5088 | |
| 9,092,249 B2* | 7/2015 | Stone | G06F 9/45541 | |
| 9,104,452 B2* | 8/2015 | Sampath | G06F 9/4445 | |
| 9,106,649 B2* | 8/2015 | Binyamin | H04L 67/16 | |
| 9,185,149 B2* | 11/2015 | Spencer | H04L 65/403 | |
| 2012/0098862 A1* | 4/2012 | Hui | H04N 7/163 | 345/649 |
| 2012/0270652 A1* | 10/2012 | Kim | A63F 13/12 | 463/32 |
| 2013/0054679 A1* | 2/2013 | Jooste | G06F 9/54 | 709/203 |
| 2013/0093776 A1* | 4/2013 | Chakraborty | G06F 9/505 | 345/520 |
| 2013/0120651 A1* | 5/2013 | Perry | H04N 21/2343 | 348/441 |
| 2013/0132971 A1* | 5/2013 | Assuncao | G06F 3/1462 | 718/105 |
| 2013/0159375 A1* | 6/2013 | Perry | H04L 67/02 | 709/201 |
| 2014/0033055 A1* | 1/2014 | Gardner | H04L 41/22 | 715/736 |
| 2014/0125682 A1* | 5/2014 | Bakalash | G06T 1/20 | 345/505 |
| 2014/0258493 A1* | 9/2014 | Frank | H04L 41/00 | 709/223 |
| 2015/0237097 A1* | 8/2015 | Devireddy | H04L 65/60 | 709/203 |
| 2015/0287161 A1* | 10/2015 | Perry | G06T 11/60 | 345/629 |

OTHER PUBLICATIONS

Matt Aranha et al., "A Physically-Based Client-Server Rendering Solution for Mobile Devices," Proceedings of the 6th International Conference on Mobile and Ubiquitous Multimedia 2007, Dec. 2007, pp. 149-154, ACM, US.

* cited by examiner

SYSTEM AND METHOD FOR PROCESSING LOAD BALANCING OF GRAPHIC STREAMS

CROSS REFERENCE TO RELATED APPLICATIONS

This Application claims priority of Taiwan Patent Application No. 101138372, filed on Oct. 18, 2012, the entirety of which is incorporated by reference herein.

BACKGROUND OF THE INVENTION

1. Field of the Invention

The present invention relates to a method and system for processing load balancing of graphic streams, and in particular, to a method and system for processing load balancing of graphic streams between a server device and a client device.

2. Description of the Related Art

Currently, information technology (IT) is driving the consolidation of computing infrastructures on servers, creating fully virtualized data centers with integrated provisioning facilities. In a fully virtualized data center, a virtual machine (VM) and a hypervisor are configured inside a server. The virtual machine runs operating systems and applications. The hypervisor is a virtual machine monitor or virtualization platform that allows multiple operating systems to run on a host computer at the same time. As several visualization-related workloads require 2D/3D graphics hardware acceleration, the cost and the power consumption of an engine room in the cloud are increased if all 2D/3D graphics operations are processed by the server device. If all the 2D/3D graphics operations are processed by the client device, the processing capacity of the client device must be taken into account.

Therefore, there is a need for a method and a system for processing load balancing of graphic streams that can dispatch the 2D/3D graphics operations to the server device and the client device.

BRIEF SUMMARY OF THE INVENTION

A detailed description is given in the following embodiments with reference to the accompanying drawings.

Methods and systems for processing load balancing of graphic streams are provided.

In one exemplary embodiment, the disclosure is directed to a method for processing load balancing of graphic streams, used in a system, wherein the system includes a server device and a client device, and the method includes: receiving, by a virtual machine of the server device, a graphic with a plurality of objects and graphic capability information; dispatching, by a dispatcher of the server device, the plurality of objects according to the graphic capability information; receiving, by a server graphic processing unit (GPU) of the server device, a first group of objects dispatched by the dispatcher, and transforming the first group of objects into a first video stream; receiving, by a virtual desktop viewer of the client device, a second group of objects dispatched by the dispatcher; transforming, by a client graphic processing unit (GPU) of the client device, the second group of objects into a second video stream; and rendering, by a virtual desktop viewer of the client device, the first video stream and the second video stream.

In one exemplary embodiment, the disclosure is directed to a system for processing load balancing of graphic streams. The system includes a server device and a client device. The server device includes a virtual machine, a virtual graphic processing unit (GPU), and a server graphic processing unit. The virtual machine is configured to receive a graphic with a plurality of objects and graphic capability information. The virtual graphic processing unit (GPU), coupled to the virtual machine, includes a dispatcher. The dispatcher, coupled to the virtual machine, is configured to dispatch the plurality of objects according to the graphic capability information. The server graphic processing unit, coupled to the virtual graphic processing unit (GPU), is configured to receive a first group of objects dispatched by the dispatcher, and transform the first group of objects into a first video stream. The client device, coupled to the server device, includes a virtual desktop viewer and a client graphic processing unit. The virtual desktop viewer is configured to receive a second group of objects dispatched by the dispatcher. The client graphic processing unit is configured to transform the second group of objects into a second video stream. After transforming the first group of objects and the second group of objects into the first video stream and the second video stream, respectively, the server graphic processing unit and the client graphic processing unit transmit the first video stream and the second video stream to a virtual desktop viewer to render the first video stream and the second video stream.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Several exemplary embodiments of the application are described with reference to FIGS. 1 through 4B, which generally relate to an electronic device and method for processing load balancing of graphic streams. It is to be understood that the following disclosure provides various different embodiments as examples for implementing different features of the application. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Figure 1:
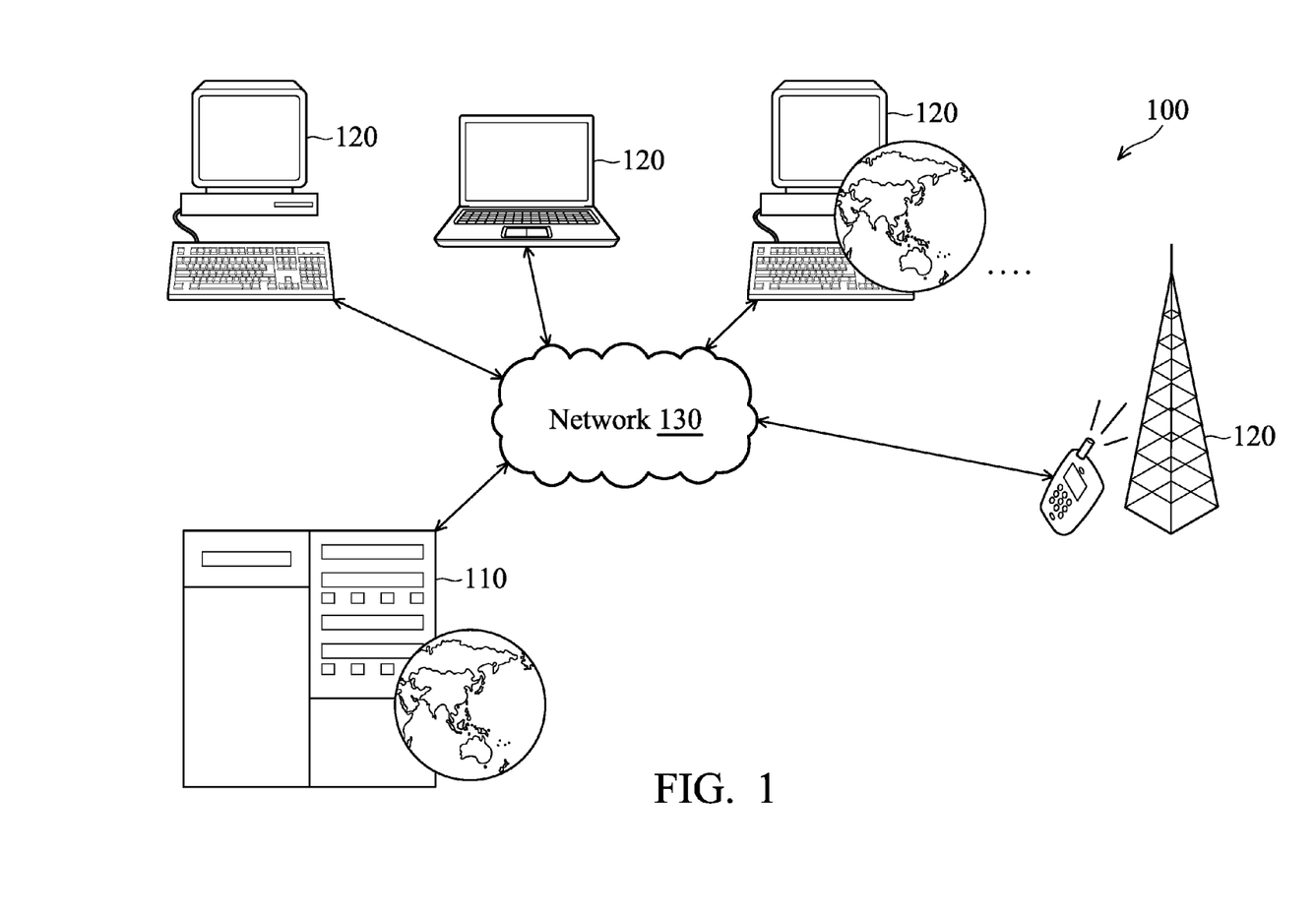
FIG. 1 is an architecture schematic view illustrating a system for processing load balancing of graphic streams according to one embodiment of the present invention.

FIG. 1 is an architecture schematic view illustrating a system 100 for processing load balancing of graphic streams according to one embodiment of the present invention. As shown in FIG. 1, the system 100 includes a server device 110 and one or more client devices 120. The server device 110 is coupled to the one or more client devices 120 over a network 130. The network 130 may be a private network (e.g., a local area network (LAN), wide area network (WAN), intranet, etc.) or a public network (e.g., the Internet).

In one embodiment, the client devices 120 may include computing devices that have a wide range of capabilities. Some of the client devices 120 may be thin clients, which serve as access terminals for users and depend primarily on the server device 110 for processing activities. A thin client has limited processing and memory capacities. For example, a thin client may be a laptop computer, cellular phone, personal digital assistant (PDA), a re-purposed desktop computer, etc. Some of the client devices 120 may be thick (fat) clients, which have graphics processors, powerful CPUs and large memories. For example, a thick client may be a dual-core or multi-core computer, workstation, graphics workstation, etc. It must be noted that the number and specification of the one or more client devices described above is not limited in the embodiments and the figures shown in this invention.

Figure 2A:
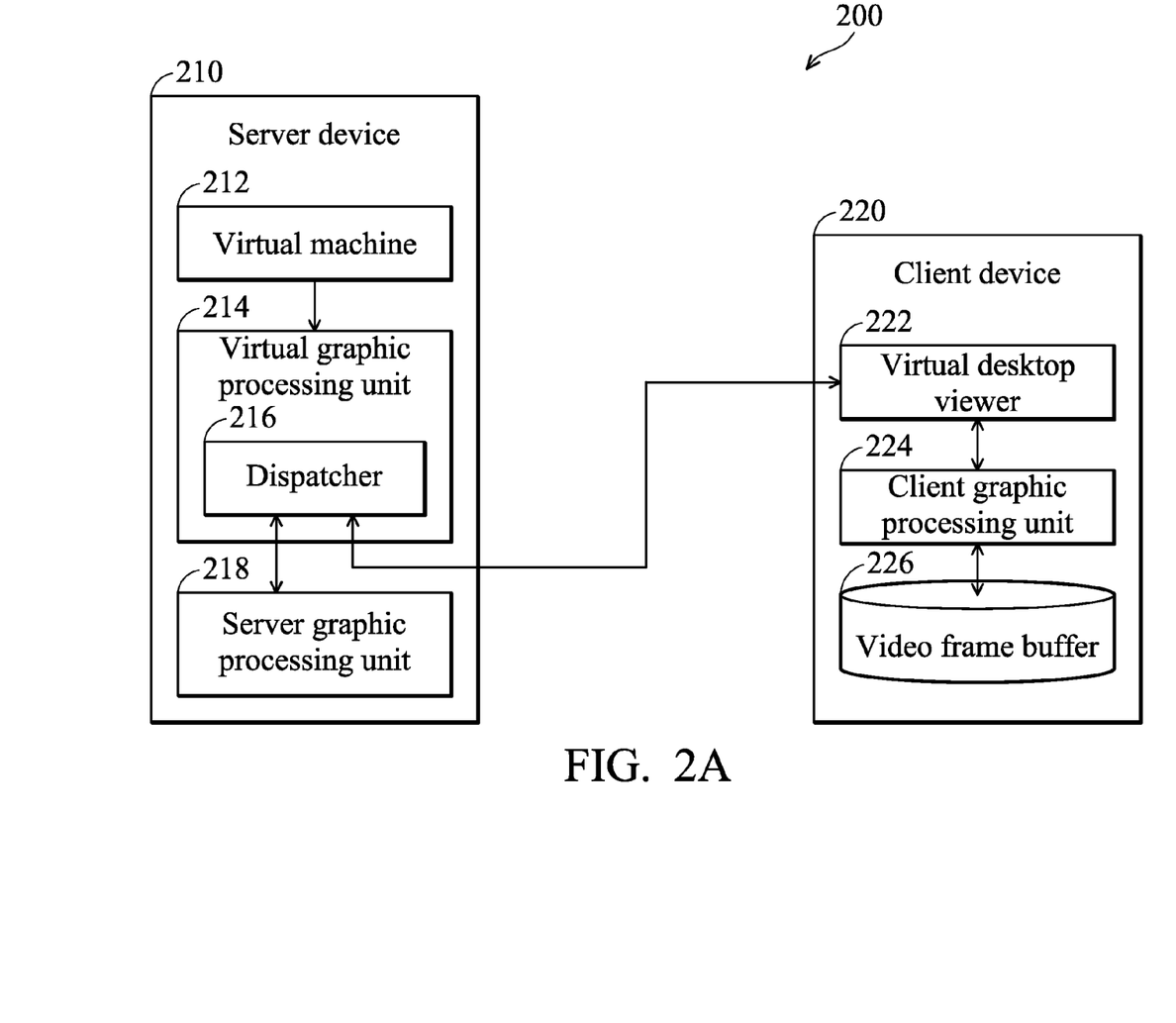
FIGS. 2A~2B are block diagrams of a system for processing load balancing of graphic streams according to an embodiment of the present invention.

FIG. 2A is a block diagram of a system 200 for processing load balancing of graphic streams according to an embodiment of the present invention. As shown in FIG. 2A, a server device 210 includes a virtual machine (VM) 212, a virtual graphic processing unit (GPU) 214 and a server graphic processing unit 218. The virtual graphic processing unit 214 is coupled to the virtual machine 212 and the server graphic processing unit 218. The virtual graphic processing unit 214 further includes a dispatcher 216. A client device 220 includes a virtual desktop viewer 222, a client graphic processing unit 224 and a video frame buffer 226.

When the client device 220 is connected to the server device 210, the client device 220 transmits graphic capability information to the server device 210. The virtual machine 212 receives a graphic with a plurality of objects transmitted from a back end device behind the server device 210 (for example, a server) and the graphic capability information transmitted from the client device 220, wherein the graphic is a 2D graphic or a 3D graphic. The graphic capability information can be a processing capability of the client device 220, a processing capability of the server device 210, an acceleration of the server graphic processing unit 218, a storage speed, a connection bandwidth and so on. After receiving the plurality of objects and the graphic capability information, the virtual machine 212 transmits the plurality of objects and the graphic capability information to the dispatcher 216 of the virtual graphic processing unit 214. The dispatcher 216 dispatches the plurality of objects in the graphic according to the graphic capability information to one of the server graphic processing unit 218 and the client graphic processing unit 224 of the client device 220, or both.

After receiving a first group of objects dispatched by the dispatcher 216, the server graphic processing unit 218 transforms the first group of objects into a first video stream and transmits the first video stream to the virtual desktop viewer 222. The virtual desktop viewer 222 of the client device 220 receives a second group of objects dispatched by the dispatcher 216, and transmits the second group of objects to the client graphic processing unit 224. After receiving the second group of objects, the client graphic processing unit 224 stores the second video stream in the video frame buffer 226, and transmits the second video stream to the virtual desktop viewer 222. Finally, the virtual desktop viewer 222 renders the first video stream and the second video stream transmitted from the client graphic processing unit 224.

Figure 2B:
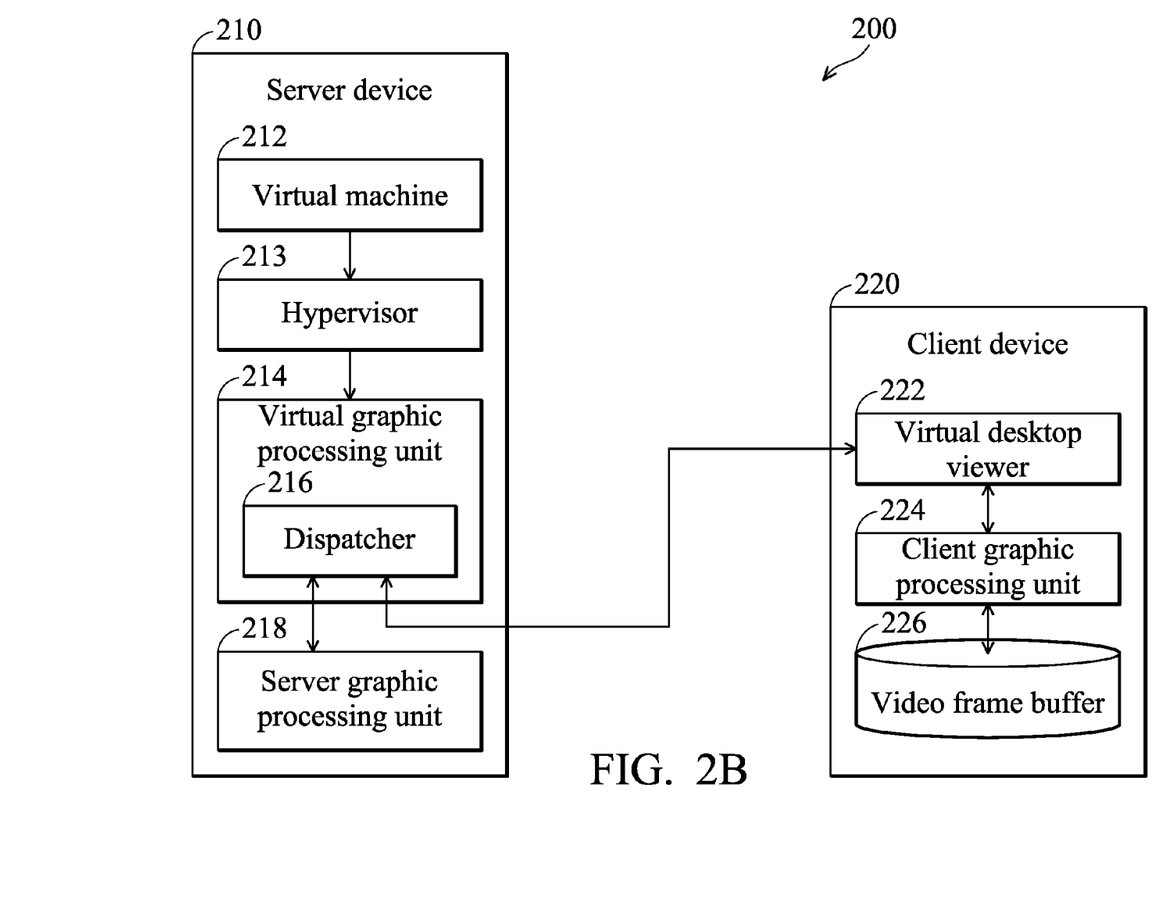

In another specific embodiment, the server device 210 further includes a hypervisor 213, as shown in FIG. 2B. When the virtual machine 212 needs to access the video stream stored in the video frame buffer 226 (for example, when a user presses a "Print Screens" button), the virtual machine 212 may transmit an access request message to the hypervisor 213. When the hypervisor 213 requests the virtual desktop viewer 222 to transmit the second video stream stored in the video frame buffer 226 to the server graphic processing unit 218 according to the access request message, the server graphic processing unit 218 combines the video stream stored in the video frame buffer 226 with the original video stream processed by the server graphic processing unit 218 to generate a complete video stream.

Figure 3:
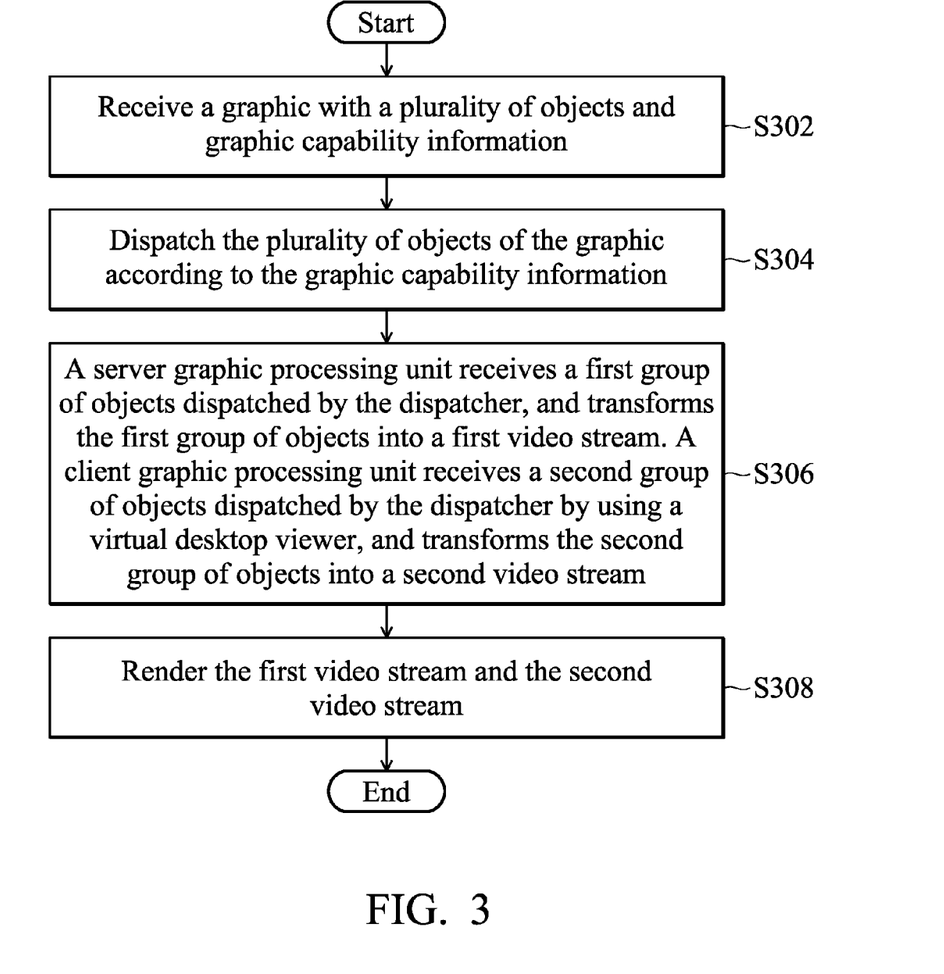
FIG. 3 is a flow diagram illustrating the method for processing load balancing of graphic streams according to an embodiment of the present invention.

FIG. 3 is a flow diagram 300 illustrating the method for processing load balancing of graphic streams according to an embodiment of the present invention with reference to FIGS. 2A~2B. The method for processing load balancing of graphic streams can be used in a system.

In step S302, a virtual machine receives a graphic with a plurality of objects and graphic capability information. In step S304, a dispatcher dispatches the plurality of objects of the graphic to graphic processing units according to the graphic capability information. In step S306, a server graphic processing unit receives a first group of objects dispatched by the dispatcher, and transforms the first group of objects into a first video stream. A client graphic processing unit receives a second group of objects dispatched by the dispatcher by using a virtual desktop viewer, and transforms the second group of objects into a second video stream. In step S308, a virtual desktop viewer renders the first video stream and the second video stream.

Figure 4A:
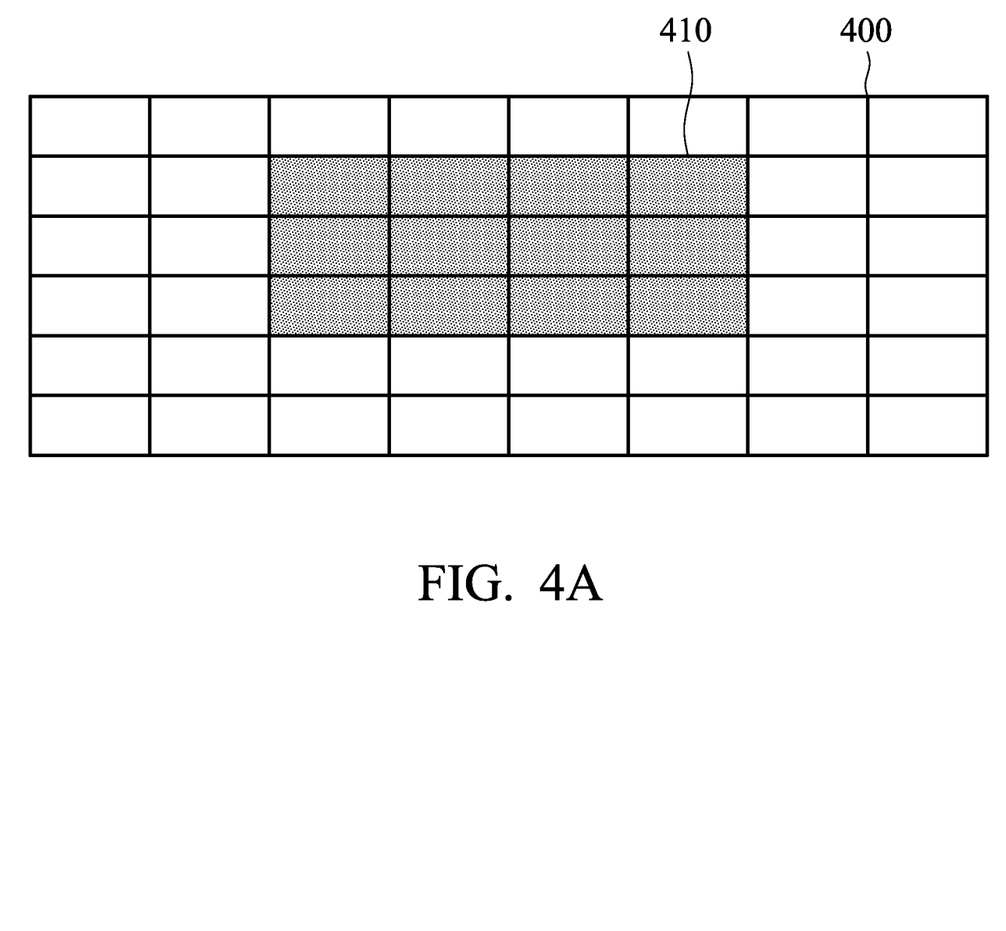
FIGS. 4A~4B are examples for processing load balancing of graphic streams according to an embodiment of the present invention.
Figure 4B:
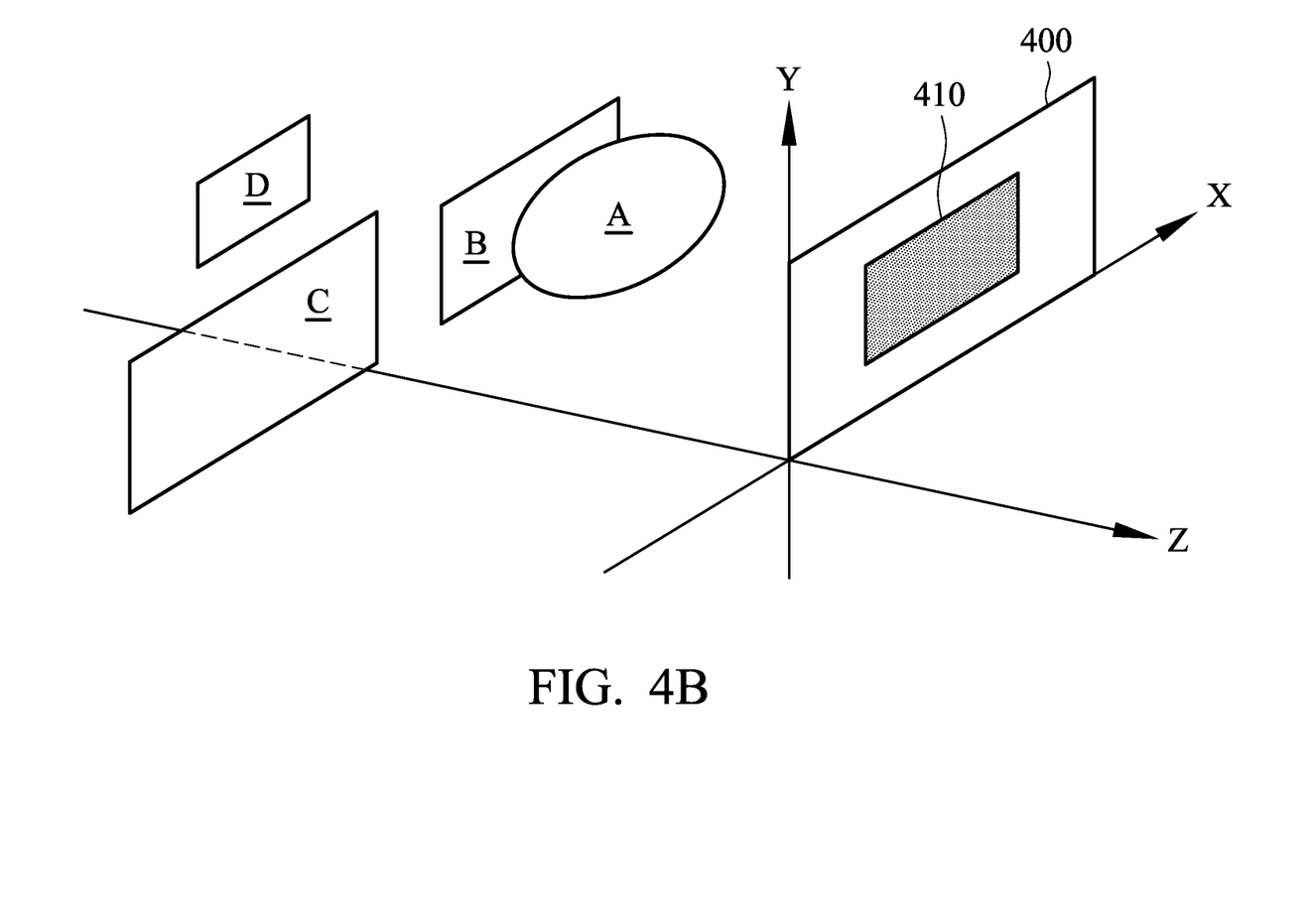

In another embodiment, the processing capability of the client device is a display ratio of a display screen for viewing the graphic processed by the client device. For example, FIGS. 4A~4B are examples for processing load balancing of graphic streams according to an embodiment of the present invention, with reference to FIG. 2. FIG. 4A is a schematic diagram illustrating a screen 400 of the client device, wherein the display screen size is 640×480. As shown in FIG. 4A, the display screen of the screen 400 is divided into small tiles, wherein the size of each tile is 80×80. Therefore, the 640×480 screen 400 may be divided into 48 small tiles. The dispatcher calculates that the client device can only process a graphics operation of 24 tiles for a certain application according to a display ratio of a display screen for viewing the graphic processed by the client device, and utilizes an optimization algorithm to determine that the client device merely processes the graphics operation in the region 410 so that the network traffic can be minimized.

In the example, the graphic includes four objects A, B, C, and D, as shown in FIG. 4B. After calculating the calculated results, the dispenser finds that the order of the object A and the object B along the Z-axis may affect the presentation of the region 410 directly. Therefore, the dispenser transmits the object A, the object B and related commands to the client device in advance. The object C does not affect the region 410, and therefore the server device may process the object C. The order of the object D along the Z-axis is far behind the X-axis and the object D is fully obscured by the object A and the object B currently, thereby, the object D is processed by the server device. However, once the position of the object C or the object D is changed and the object C or the object D may affect the region 410, the dispenser may copy and transfer the object C or the object D to the client device, and then the client device can process the object C or the object D.

In some embodiments, the dispenser can dispatch the plurality of objects of the graphic according to a connection bandwidth between the client device and the server device.

According to the above mentioned invention, by using the method and the system for processing load balancing of graphic streams, the client graphic processing unit of the client device merely needs to process parts of the objects of the graphic and the related commands to render the graphic in a smaller window. The remaining parts of the objects can also be transferred through the network, and the server graphic processing unit of the server device only needs to process the remaining parts of the objects not processed by the client device.

The method for processing load balancing of graphic streams or any forms for carrying out the method, or any parts thereof may be implemented in a computer program, wherein the computer program may be stored in any machine-readable storage medium, such as a floppy disc, hard disc, optical disc, or computer program product with any external form. Particularly, when the computer program is loaded and executed by an electronic device, e.g., a computer, the electronic device becomes an apparatus or system for performing the steps of the generating method of interactive page templates. Alternatively, the computer program may be transferred via certain transferring media, such as electric wires/cables, optical fibers, or others.

Correspondingly, the invention also proposes a machine-readable storage medium comprising a computer program, which, when executed, causes an electronic device to perform the generating method of interactive page template. The steps of the method are as described above with respect to FIG. 3 and, thus, detailed description of the method is omitted here for brevity.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for processing load balancing of graphic streams, used in a system, wherein the system includes a server device and a client device, the method including:
receiving, by a virtual machine of the server device, a graphic with a plurality of objects and graphic capability information;
dispatching, by a dispatcher of the server device, the plurality of objects according to the graphic capability information;
receiving, by a server graphic processing unit (GPU) of the server device, a first group of objects dispatched by the dispatcher, and transforming the first group of objects into a first video stream;
receiving, by a virtual desktop viewer of the client device, a second group of objects dispatched by the dispatcher;
transforming, by a client graphic processing unit (GPU) of the client device, the second group of objects into a second video stream;
storing, by a video frame buffer of the client device, the second video stream; and
rendering, by a virtual desktop viewer of the client device, the first video stream and the second video stream,
wherein the method further comprises:
receiving, by a hypervisor, an access request message transmitted by the virtual machine,
wherein when receiving the access request message, the hypervisor requests the virtual desktop viewer to transmit the second video stream stored in the video frame buffer of the client device to the server graphic processing unit according to the access request message.

2. The method for processing load balancing of graphic streams as claimed in claim 1, wherein the graphic capability information is one of a processing capability of the client device, a processing capability of the server device, an acceleration of the server graphic processing unit, a storage speed and a connection bandwidth.

3. The method for processing load balancing of graphic streams as claimed in claim 2, wherein the processing capability of the client device is a display ratio of a display screen for viewing the graphic processed by the client device.

4. The method for processing load balancing of graphic streams as claimed in claim 1, wherein the graphic is a 2D graphic or a 3D graphic.

5. A system for processing load balancing of graphic streams, including:
a server device, including:
a virtual machine, configured to receive a graphic with a plurality of objects and graphic capability information;
a virtual graphic processing unit (GPU), coupled to the virtual machine, comprising:
a dispatcher, coupled to the virtual machine, configured to dispatch the plurality of objects according to the graphic capability information; and
a server graphic processing unit, coupled to the virtual graphic processing unit (GPU) and configured to receive a first group of objects dispatched by the dispatcher, and transform the first group of objects into a first video stream;
a hypervisor, configured to receive an access request message transmitted by the virtual machine; and
a client device, coupled to the server device, comprising:
a virtual desktop viewer, configured to receive a second group of objects dispatched by the dispatcher;
a client graphic processing unit, configured to transform the second group of objects into a second video stream; and
a video frame buffer, configured to store the second video stream,
wherein when receiving the access request message, the hypervisor requests the virtual desktop viewer to transmit the second video stream stored in the video frame buffer to the server graphic processing unit according to the access request message;
wherein after transforming the first group of objects and the second group of objects into the first video stream and the second video stream, respectively, the server graphic processing unit and the client graphic processing unit transmit the first video stream and the second video stream to a virtual desktop viewer to render the first video stream and the second video stream.

6. The system for processing load balancing of graphic streams as claimed in claim 5, wherein the graphic capability information is one of a processing capability of the client device, a processing capability of the server device, an acceleration of the server graphic processing unit, a storage speed and a connection bandwidth.

7. The system for processing load balancing of graphic streams as claimed in claim 5, wherein the processing capability of the client device is a display ratio of a display screen for viewing the graphic processed by the client device.

8. The system for processing load balancing of graphic streams as claimed in claim 5, wherein the graphic is a 2D graphic or a 3D graphic.

* * * * *